United States Patent [19]

Sato et al.

[11] 3,955,081

[45] May 4, 1976

[54] EXPOSURE CONTROL CIRCUIT

[75] Inventors: Takayoshi Sato, Tokyo; Kunio Ando, Warabi, both of Japan

[73] Assignee: Fuji Photo Optical Co., Ltd., Omiya, Japan

[22] Filed: Apr. 2, 1974

[21] Appl. No.: 457,171

[30] Foreign Application Priority Data

Apr. 4, 1973 Japan.............................. 48-38579

[52] U.S. Cl................................. 250/210; 250/212
[51] Int. Cl.²......................................... H01J 39/12
[58] Field of Search............................ 250/210, 212

[56] References Cited
UNITED STATES PATENTS

| | | | |
|---|---|---|---|
| 2,142,940 | 1/1939 | Hackenberg et al............ | 250/210 X |
| 2,219,928 | 10/1940 | Kalmus et al................... | 250/210 X |
| 3,160,759 | 12/1964 | Ward.............................. | 250/210 X |
| 3,473,036 | 10/1969 | Marcus........................... | 250/212 X |

*Primary Examiner*—Alfred E. Smith
*Assistant Examiner*—T. N. Grigsby

[57] ABSTRACT

An exposure control circuit connected with an electrically operated exposure control element such as an electric shutter or an electrically controlled diaphragm includes a bridge circuit. The bridge circuit has four arms and is provided in one arm thereof with a photodetector to receive light from the object to be photographed. A resistor is connected in series with the photodetector to convert the current flowing through the photodetector into a voltage. A transistor is connected with the photodetector to amplify the photocurrent thereof. Another resistor is connected with the transistor to convert the current obtained by amplification of the photocurrent of the photodetector by use of the transistor to a voltage. These two resistors are provided in one arm of the bridge circuit so as to be independently varied of their resistance.

2 Claims, 3 Drawing Figures

EXPOSURE CONTROL CIRCUIT

BACKGROUND OF THE INVENTION

1. Field of the Invention

This invention relates to an exposure control circuit for use in a photographic or cinematographic camera including an automatic exposure controlling element such as an electric shutter or an electrically controlled diaphragm, and more particularly to an exposure measuring circuit including a photodetector in one arm of a bridge circuit connected with an electric exposure controlling element in a camera.

2. Description of the Prior Art

It has heretofore been well known in the art to measure the illumination of an object to be photographed by use of an electric circuit including a bridge circuit having a photodetector in one arm thereof. The imbalance output of the bridge circuit including the photodetector which receives light from the object varies with the variation in the brightness of the object. In the bridge circuit which has three arms beside the arm including the photodetector, three factors of exposure can be set. The number of the factors of exposure which can be set in the circuit is desired to be as large as possible.

The factors of exposure to be set in the exposure control circuit beside the information of the brightness of the object to be photographed detected by the photodetector are, for instance, shutter speed or open angle of a rotary shutter (in case of a movie camera), film sensitivity, diaphragm and frame speed (in case of a movie camera). One of the arms of the bridge circuit usually includes a fixed resistor to fix the level of the bridge circuit and accordingly the level of the correct exposure which is desired to be obtained. Further, in addition to these factors, it is sometimes desired to take the back-light into consideration and put a factor concerned with the back-light in the bridge circuit.

The conventional exposure control circuit including a bridge circuit has been limited in the number of exposure factors to be set therein. Therefore, in one example of the conventional movie camera including such an exposure control circuit to control a diaphragm, one arm is used to determine the level of the bridge circuit, a second arm includes a photodetector and used to measure the brightness of the object to be photographed, a third arm is used to set the film sensitivity, and the fourth arm is used to set either the open angle of the rotary shutter or the frame speed. In the fourth arm, a mechanical switch over means is provided to select the open angle of the rotary shutter or the frame speed. If the back-light control is desired to be set in the circuit in the conventional exposure control circuit, a mechanical switch over means must be provided in the arm used for the film sensitivity or in the arm used for the level control. The above described conventional exposure control circuit which requires a mechanical switch over means in an arm of the bridge circuit suffers from the complexity in construction and operation.

SUMMARY OF THE INVENTION

In light of the foregoing observations and description of the conventional exposure control circuit for use in a camera, the principal object of the present invention is to provide an exposure control circuit including a bridge circuit in which two factors of exposure can be set in one arm thereof.

Another object of the present invention is to provide an exposure control circuit including a bridge circuit in which four factors of exposure beside th illumination can be independently selected.

Still another object of the present invention is to provide an exposure control circuit which simplifies the construction of the exposure control device in the automatic exposure control camera.

The above objects of the invention are accomplished by providing a semiconductor element connected in series with a photodetector in one arm of the bridge circuit and providing two resistors connected therewith in another arm thereof. One of the resistors is used to convert the current flowing through said photodetector into a voltage and the other resistor is used to convert the current obtained by amplifying the photocurrent of said photodetector with said semiconductor element into a voltage. By changing the resistance of the two resistors, two factors of exposure can be independently changed. Beside the two resistors, two more resistors are provided in the other two arms, respectively. Thus, four resistors can be provided in the bridge circuit beside the photodetector. By making the resistors variable, it is possible to vary the exposure factors. The photodetector used in the bridge circuit may be of photovoltaic type or photoconductive type. The present invention will be hereinafter described with reference to embodiments with both types of photodetector.

DESCRIPTION OF THE PREFERRED EMBODIMENTS

Figure 1:
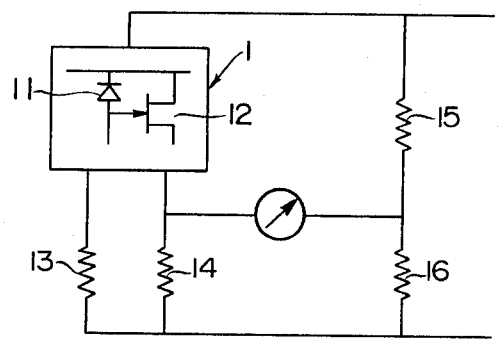
FIG. 1 is a schematic circuit view showing the basic construction of the bridge circuit employed in one embodiment of the present invention.

Referring to FIG. 1 which shows the basic construction of the bridge circuit employed in one embodiment of the present invention, a first arm 1 of the bridge circuit comprises a photodetector 11 and a semiconductor element 12 such as a transistor. A first and second resistors 13 and 14 are connected in parallel with the first arm 1. A third and fourth resistors 15 and 16 are provided in the third and fourth arms of the bridge circuit. The first resistor 13 serves to convert the current flowing through the photodetector 11 into a voltage, and the second resistor 14 serves to convert the current obtained by amplifying the photocurrent of the photodetector 11 by use of said transistor 12 into a voltage. The four resistors 13, 14, 15 and 16 can be used to independently set or select four factors of exposure. By making the resistors variable, the exposure factors set therein can be varied. The imbalance output of the bridge circuit is used to control an exposure controlling element such as a diaphragm or a shutter speed control means with reference to factors of exposure set in the resistors. For instance, the imbalance output of the bridge circuit including four resistors representing four exposure factors is amplified through an amplifier and used to drive a servomotor to control a diaphragm to obtain a correct exposure with reference to the four exposure factors.

Figure 2:
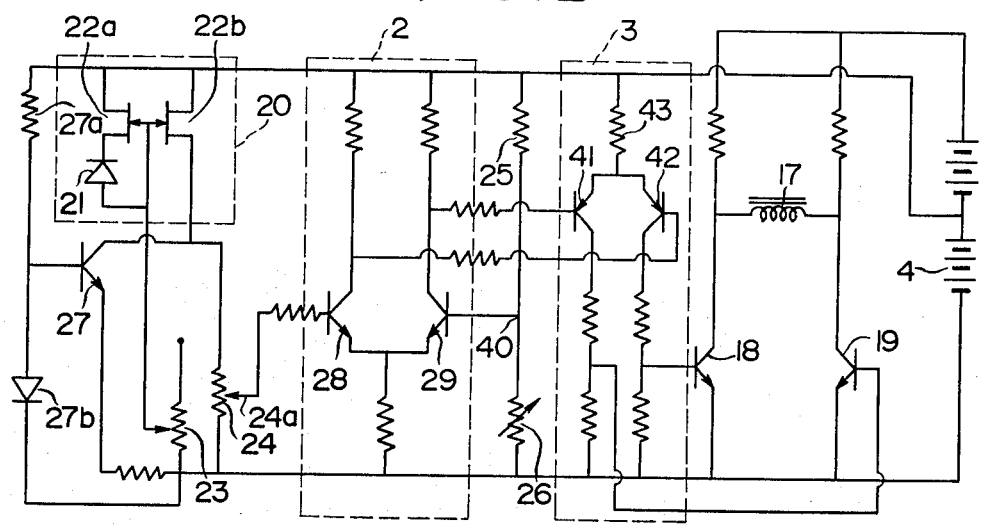
FIG. 2 is an entire circuit view of a preferred embodiment of the present invention in which a photovoltaic type photodetector is used.

An example of such an automatic exposure control circuit in which a diaphragm is controlled by a servomotor driven by the imbalance output of the bridge circuit is shown in FIG. 2. A bridge circuit is basically comprised of three resistors 24, 25 and 26 and a detecting circuit 20 including a photodetector 21 of photovoltaic type such as a silicon blue cell (SBC) and a pair of field effect transistors (FET) 22a and 22b. The first field effect transistor 22a serves to prevent the silicon blue cell 21 from being impressed with a high voltage and supplies a voltage between the source and the gate thereof to the silicon blue cell 21. The second field effect transistor 22b serves to perform the impedance conversion of the silicon blue cell and amplifies the photocurrent thereof. A resistor 23 is connected between the resistor 24 and the detecting circuit 20 to convert the current flowing through the silicon blue cell 21 into a voltage. The resistor 23 and the resistor 24 are independent of each other and constitute together an arm of the bridge circuit. The resistor 24 serves to convert the photocurrent amplified by the second field effect transistor 22b into a voltage. A transistor 27 for providing a constant current circuit is connected between the second field effect transistor 22b and the resistor 24 to make the accurate division of the voltage at the point $x$ when the resistance of the resistor 24 is changed to set an exposure factor e.g. the film sensitivity. A resistor 27a and a diode 27b are connected with the base of the transistor 27 to keep the base current thereof constant and form a constant current circuit with the transistor 27.

A servomotor 17 associated with a diaphragm (not shown) of a camera is connected with output transistors 18 and 19 which are controlled by two differential amplifiers 2 and 3 comprising transistors 28 and 29, and 41 and 42, respectively. The output from the transistors 28 and 29 of the first differential amplifier 2 is put into the transistors 41 and 42 of the second differential amplifier 3. In case of a TTL (Through the Taking Lens) type camera in which the light coming through the taking lens is measured, the photodetector 21 receives light coming through said diaphragm. In case that the camera is not of the TTL type, the diaphragm associated with the servomotor 1 is associated with a diaphragm located in front of the photodetector 21. The series circuit of the detecting circuit 20 and the variable resistor 24 is connected across an electric source 4. A series circuit of said two resistors 25 and 26 is also connected across the electric source 4. Further, a slide contact 24a of the variable resistor 24 is connected with the connecting point 40 of the two resistors 25 and 26 through said first differential amplifier 2 so that the imbalance current of the bridge circuit may be taken out as an input of the first differential amplifier 2. In detail, the slide contact 24a of the variable resistor 24 is connected with the input terminal of the transistor 28, and the connecting point 40 between the resistors 25 and 26 is connected with the input terminal of the transistor 29 of the first differential amplifier 2. Thus, the imbalance output of the bridge circuit constituted by the photodetector 21, the variable resistor 24 and the two resistors 25 and 26 is amplified by the first differential amplifier 2. The output of the first differential amplifier 2 is further amplified by the second differential amplifier 3. The output of the second differential amplifier 3 is used to actuate the servomotor 17 by way of said output transistors 18 and 19, and the diaphragm of the camera is controlled thereby.

If the resistor 23 is variable and the resistance thereof can be independently varied, it is possible to set the shutter speed or the open angle of the rotary shutter in a movie camera in the variable resistor 23. Further, if one of the other resistors 25 is used to determine the level of the correct exposure and the other resistor 26 is used to set the frame speed, the servomotor 17 can be controlled with reference to the four exposure factors. Thus, the diaphragm (not shown) is controlled to obtain the predetermined level of the correct exposure selected by the resistor 25 with reference to the film sensitivity, the shutter speed and the frame speed.

Figure 3:
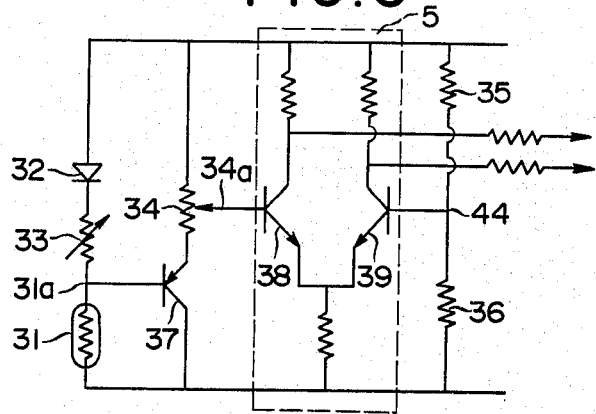
FIG. 3 is a partial circuit view of another embodiment of the present invention in which a photoconductive type photodetector is used.

Another embodiment of the present invention in which a photoconductive type photodetector such as a cadmium sulfide element is shown in FIG. 3. A photoconductive type photodetector 31 is connected in series with a variable resistor 33 and a diode 32, and a connecting point 31a between the variable resistor 33 and the photodetector 31 is connected with the base of a transistor 37 the emitter of which is connected with another variable resistor 34. Th sliding contact 34a of the variable resistor 34 is connected with a connecting point 44 between two resistors 35 and 36 by way of a differential amplifier 5 comprising a pair of transistors 38 and 39, so that the imbalance output of the bridge circuit constituted by the variable resistor 34, the photodetector 31, the resistor 35 and the resistor 36 may be amplified by the differential amplifier 5. The output of the differential amplifier 5 is further amplified by another amplifier connected therewith and transmitted to a servomotor like the one 17 employed in the foregoing embodiment shown in FIG. 2. The diode 32 connected between the first variable resistor 33 and the second variable resistor 34 serves to control the voltage between the base and the emitter of the transistor 37. The variable resistor 33 connected in series with the photodetector 31 serves to control the current flowing through the photodetector 31. The resistor 34 connected with the emitter of the transistor 37 serves to take out the variation in the base voltage of the transistor 37, caused by the variation in the amount of light received by the photodetector 31, as a variation in the emitter current thereof. In this embodiment also, the servomotor can be controlled with reference to the resistance of the four resistors 33, 34, 35 and 36 in which any kind of exposure factors can be set.

We claim:

1. An exposure control circuit including a bridge circuit having four arms connected with a power supply and with an amplifier to amplify the imbalance output thereof and transmit the amplified output to a means to operate an exposure control element in accordance with several kinds of exposure input information put in the circuit comprising in combination;

a photovoltaic type photodetector for input of first exposure information provided in the first arm of said bridge circuit to receive light from the object to be photographed, said photodetector being connected between the source and the gate of a first field effect transistor to protect the photodetector from a high voltage, a transistor connected with said photodetector to amplify the photocurrent thereof, a first resistor for input of second exposure information connected with said photodetector to convert the current flowing through the photodetector to a corresponding voltage, said first resistor and said photodetector being connected in series with the power supply, a second resistor for input of third exposure information provided in the second arm of the bridge circuit and connected with said transistor to convert the current taken out by the transistor to a corresponding voltage, said first and said second resistors being connected in parallel with the power supply, a third resistor for input of fourth exposure information provided in the third arm of the bridge circuit, and a fourth resistor for input of fifth exposure information provided in the fourth arm of the bridge circuit, whereby five kinds of exposure information are independently put into the bridge circuit.

2. An exposure control circuit as defined in claim 1 wherein said photovoltaic type photodetector is connected with the gate of a second field effect transistor which amplifies the photocurrent of the photodetector.

* * * * *